Figure 1:
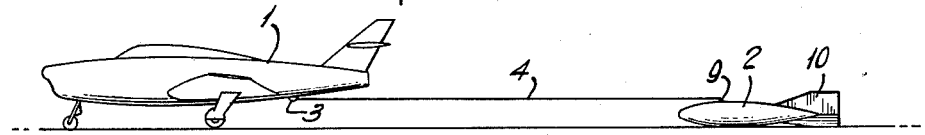

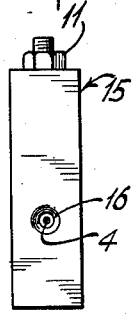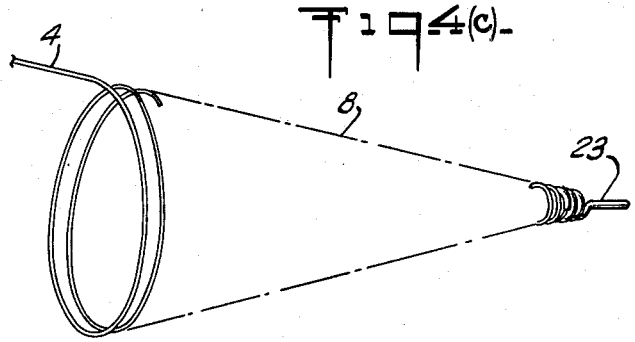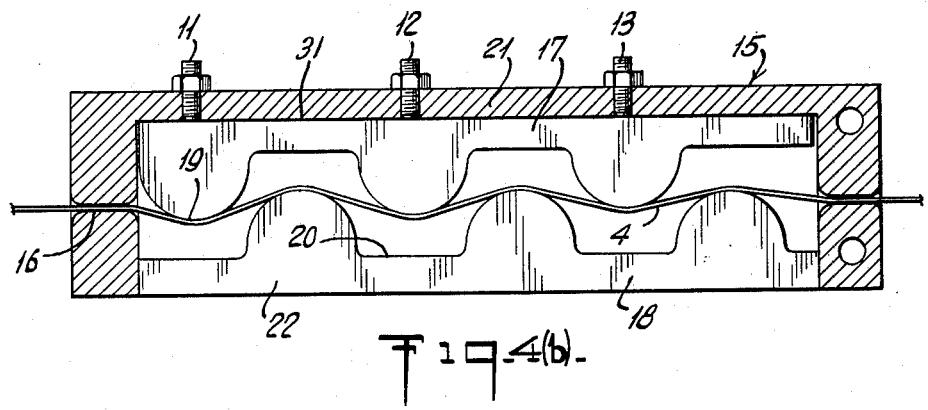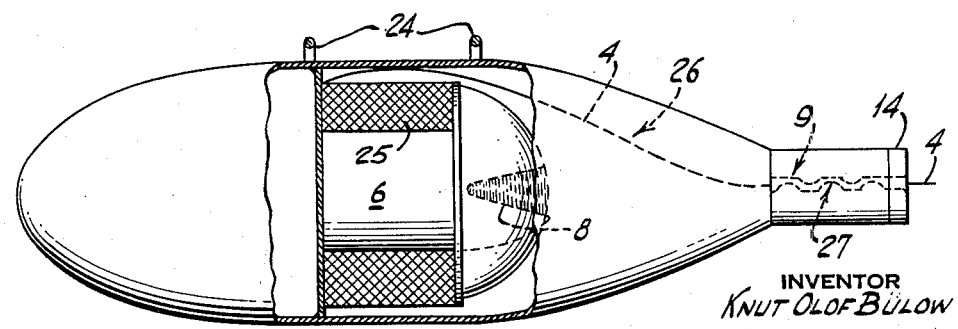

United States Patent Office 3,143,346
Patented Aug. 4, 1964

1

3,143,346
DEVICE FOR REGULATING AND STOPPING THE REMOVAL OF CABLE FROM A TOW TARGET CABLE STORAGE MEANS
Knut Olof Bülow, Strandpromenaden 18, Nasbypark, Sweden
Filed July 18, 1961, Ser. No. 124,986
5 Claims. (Cl. 273—105.3)

The present invention relates to an arrangement for controlling and braking the towing cable of air targets towable by aeroplanes and intended for anti-aircraft and aerial combat practice, in which arrangement the main part of the towing cable may be payed out when both the towing aeroplane and the target are flying.

In anti-aircraft and aerial combat practice target devices being more or less like aeroplanes have been used for a long time, which targets are arranged to be towed by ordinary aeroplanes. Nowadays such target devices are usually provided with hit indicators and radar reflectors in order to make possible recording of hits and use of radar sights, respectively. In view of the increased speeds of modern military aircraft a demand of targets adapted to such speeds has arisen and many constructions of such targets have been proposed. In one of the previously known constructions the target consists of an inflated or foam plastic filled long balloon having a very small weight and therefore involving no danger for persons or objects if and when it crashes. The towing cables hitherto utilized consisting of wires with leads to the hit indicators belonging thereto are among other things because of their high prices scarcely suitable for such targets. Furthermore simple hit indicators have been proposed which make use of wireless transmission of the hit recording from the target itself for which reason message transmission leads to the towing aircraft are no longer needed. Common towing cables require comparatively complicated means for winding on and off the cable, including particular braking means on board the towing aeroplane which means contribute to the fact that said aeroplane has a great weight and thus to a greater fuel consumption per flying hour. As a consequence of the mentioned facts it is obvious that a simplification of the towing cable and of the braking and winding off means is both possible and highly desirable. Provided that the towing cable is cheap it may upon finished target shooting simply be thrown away and any winding on and hoisting in of the cable is not required and the effective time for practice per flying hour may thus be increased.

The invention fulfils the above mentioned objects and makes it possible to pay out the cable at the desired rate, and when the predetermined desired cable length has been payed out, the cable is smoothly and effectively braked. When target shooting is finished, the cable is simply cut off and the target together with the cut off cable may land by itself, whereupon the target and its useful parts are collected, whereas the cable and in certain cases also the braking means are not collected.

An arrangement according to the present invention is mainly characterized by the fact that the cable, when being payed out from a cable magazine arranged within the target or the towing aeroplane, is arranged to pass through a zigzag-shaped path in a channel of a braking means, which channel exerts a resistance against the free passage of the cable. The braking means may consist of a clamping device or a zigzag-shaped tube.

The towing cable, which may be, for example, a pianowire, may have at its end an enlarged diameter in order to produce a stop means being operative when the predetermined desired cable length has been payed out. The cable end may be wound into the shape of a screw coil, and be provided with sharp bendings or turns which exert a great resistance against the passage of the cable through the channel of the braking means. The diameter of the cable end may also increase successively or abruptly, such as by the use of a metal or plastic coating having increasing thickness, whereby a smooth braking of the cable is obtained at its end and finally a locking of said end in the braking means.

Other features of the invention will appear from the following description of the embodiments of the invention represented on the attached drawing and chosen as examples.

Figure 2:
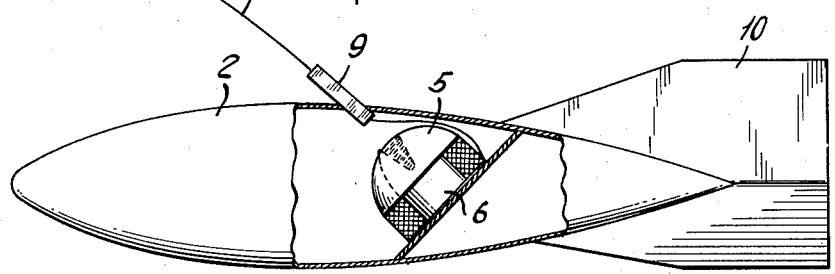
Figure 3:
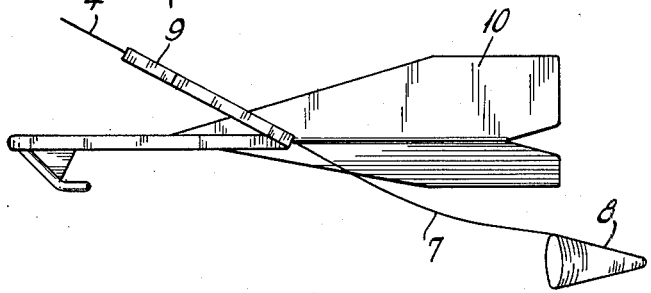
Figure 5:
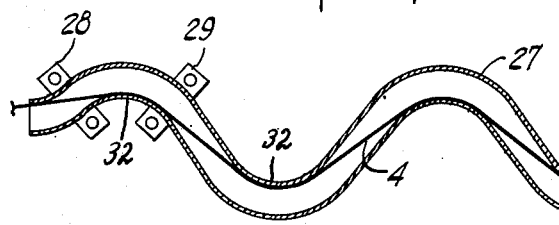

In the drawing,

FIG. 1 illustrates diagrammatically an aeroplane and a target on the ground,

FIG. 2 illustrates a target having an embodiment of the cable winding and braking arrangement according to the invention, FIG. 3 illustrates another target having a braking arrangement according to the invention, FIGS. 4a and 4b illustrate details of a braking device and FIG. 4c shows a preferred manner of winding a portion of the stored cable according to the invention, FIG. 5 illustrates diagrammatically a modified braking arrangement according to the invention, and FIG. 6 illustrates an embodiment of a cable unwinding and braking arrangement intended to be carried by the towing aeroplane.

More specifically FIG. 1 illustrates a towing aeroplane 1 having an air target 2 connected to a fastening means 3 on the aeroplane by means of a towing cable 4. The wire or cable 4 is thereby for take-off laid out on the runway with one part of its length on the ground and the remaining part in a cable magazine as will be described hereinafter.

In FIG. 2 there is shown diagrammatically an air target having a main portion 2 and a tail portion 10. The target is partly broken away in order to show a magazine 5 for the towing cable, which consists of piano-wire and is wound around a reel 6 in the bottom of the magazine. The object of the invention is, as has been mentioned above, among other things, to provide braking of the cable when it is payed out, so that a suitable cable length will be payed out per time unit, and, when the desired cable length has been payed out and the cable approaches its end, to provide a smooth braking without jerks, until the end of the cable has been reached, and then provide locking of the cable in the braking device. This may according to the invention be obtained by having the cable 4 pass through a braking device, when it is payed out, which device has a channel opposing the free passage of the cable. The cable end may be thickened in any way, whereby the action of the braking device at the cable end will successively be more and more vigorous, until the cable can no more under the tractive force action from the towing aircraft pass through the braking device but is locked therein, so that any further cable length cannot be payed out and the shooting exercise may begin with the target towed at the desired distance behind the towing aeroplane. In the embodiment shown by way of example in FIG. 2 the cable 4, during successive reeling off from the reel 6 and under the action of the tractive force from the towing aircraft, passes through a braking device 9 having a passage channel for the cable which is so arranged that the main part of the cable may pass through this channel with a certain braking action.

In FIG. 3 another type of air target is shown which has no room for any cable magazine. In such a case the desired cable length is laid out upon the ground with one part 4 between the towing aeroplane and the target 10 and another part 7 arranged behind the target. The latter is provided with a braking device 9 for firmly locking the cable therein as will appear.

In FIGS. 4a and 4b there is shown a suitable braking device according to the invention and in FIG. 4c the cable end is shown more in detail. The cable of piano-wire passes a clamping means 15 from the right to the left and is drawn out through a bore 16 provided at the left hand part. The clamping means consists of a rectangular casing in the interior of which two jaws 17 and 18 are arranged. These jaws are provided with alternating fixed projections 19 and recesses 20, so that the wire 4 will pass through the clamping means in a zigzag-shaped path. If desired, the casing 15 may be tapered from the right to the left and moreover one or both of the jaws 17 and 18 may be loose and may move slightly to the left under the influence of the load from the wire 4. In FIGURE 4b, suitable friction surface 31 is provided between the jaw 17 and the casing top 21, whereby the arrangement is such that the resistance against the passage of the main portion of the wire is suitable for the desired passage rate of the piano-wire. The mutual dimensions of the recesses 20 and the projections 19 are also chosen with these objects in mind. The wire may have the general shape shown in FIG. 4c, with an enlarged end portion 23 so that when said end has been reached, an increased force moves the jaw or jaws to the left against the action of the friction between these parts and the casing which friction is gradually overcome.

In FIG. 4c the cable end is shown as a backwardly tapering screw wound coil 8 in the general shape of a cone. The turns of wire at the pointed end of the coil 8 have a progressively enlarged diameter, culminating in the enlarged end 23. Because of such a screw winding of the piano-wire an increasingly higher resistance is exerted during the passage through the clamping means of this wire, which resistance will finally become higher than the tractive force applied to the cable, so that the cable end will be locked in the clamping means. A braking free from jerks and finally a locking is thus received at the cable end. Alternatively the diameter of the wire end may be increased by a plastic coating on this end. Other forms of cable ends are also possible, such as sharp bendings or turns.

As has been mentioned above the jaws 17 and 18 may be movable under the influence of the friction force caused by the cable 4, so that the jaws are moved to the left under the action of the cable end, until a complete wedging of said end in the clamping means is obtained.

In order to prevent damages by the heat produced in the clamping means the braking device may be provided with cooling flanges (not shown). The mean diameter of the channel in the clamping means may, as appears from FIGS. 4a and 4b, be altered by means of screw arrangements 11 to 13, which act upon the position of the upper jaw 17 in relation to the lower jaw 18 in order to adapt the clamping means to towing cables or wires having different sizes.

An alternative to the described clamping means is shown in FIG. 5. The zigzag-shaped passage path for the cable 4 is in this case formed in a tube 27, which is provided with fastening means 28, 29, shown diagrammatically. The inside surface of the portions 32 of the tube 27 constitute fixed, non-rotatable cable engaging surfaces similar to the projections 19 of FIG. 4b. The tube may be in the form of sine-shaped waves, and is suitably made of steel. This modified embodiment of the invention has proved to be suitable in practice and is moreover very cheap.

According to FIGS. 1 and 2 the winding off and braking arrangement is carried by the target itself, and in the particular target shown in FIG. 3 the winding off means is omitted, whereas the braking means is arranged on the target. In the last mentioned case the cable is, as has been mentioned above, laid out on the ground before take-off and passes through the braking means under the action of the tractive force in the towing cable upon take-off of the towing aeroplane. When a certain amount of cable length has been payed out through the braking device the target will finally take off. When the cable is dragged upon the ground in this way the part 8 at the cable end will give a stabilizing effect to the cable. A corresponding effect is in the arrangement of FIG. 1 provided by means of the weight of the target itself.

As an alternative to the above described embodiments the target may at take-off from the ground be suspended beneath a wing of the towing aeroplane and be payed out from said aeroplane during flying. Thereby it is suitable to have the cable magazine arranged in the towing aircraft instead of in the target, whereby one cable end is attached to the nose of the target. A winding off and braking arrangement of this kind is shown in FIG. 6. In this figure numeral 24 represents fastening means on the aeroplane wing for the winding off and braking arrangement 26. As has been indicated above, the piano-wire is wound on a bobbin 25 on a reel 6 for reeling off therefrom. The conical screw winding 8 is arranged in a certain space, so that it is easily advanced to the braking means 9, when all the cable has been reeled off the reel 6. At 14 a cut off device is shown by means of which the towing cable may be cut off, when the target after finished target towing flight shall be disconnected from the towing aeroplane.

Among the advantages of the invention is observed that no hoisting means for paying out the cable are required, whereby the flying weight of the towing aircraft is reduced. The towing aircraft will not have to land with any cable length dragged behind it, and the hoisting in of the towing cable after finished target shooting required in previous constructions is eliminated, whereby the effective exercise time per flying hour is increased. If a towing cable consisting of piano-wire is utilized this cable may simply be cut off, when the target shooting exercise has been finished and the towing aircraft may thus land without any dragged cable and the target may fall down by itself, whereupon those parts of it, which may still be utilized may be collected. The piano-wire is much cheaper than the towing cables hitherto known and it may thus simply be lost. The present types of air targets are furthermore not easily spoiled so that they are not as a rule damaged seriously when landing by themselves. This is among other things true for such devices as gas or foam plastic filled targets. The targets are moreover as a rule not damaged during the target shooting exercise because of the fact that direct hits are exceptional and that exercise ammunition is utilized for the shooting. The presence of projectile paths within a certain range around the target are thereby recorded as hits by means of acoustic, radio or radar hit indicators.

The invention has been described in connection with some examples but many other modifications are possible within the scope of the attached claims.

What is claimed is:

1. In combination, a towing vehicle and a towable vehicle, a cable braking device connected to one of said vehicles and a mechanical connection provided on the other of said vehicles, a cable secured to said mechanical connection at one end and adapted to be slidingly engaged within said braking device at a distance from said end, and storage means including a reel associated with said braking device for storing a portion of said cable in a coiled condition to be payed out through said cable braking device, a portion of the cable on said storage means being wound in the shape of a cone, a portion of the cable of said cone being provided with a progressively enlarged diameter along its length, said device having a channel provided with a plurality of non-rotatable friction surfaces adapted to be progressively engaged by said cable, whereby the increased force required to unwind said cable in the shape of a cone causes increased frictional force between said cable and said friction surfaces to thereby control the rate at which the stored portion of said cable is payed out, and the travel of said cable through said braking device being arrested when said enlarged diameter portion of said cable engages said non-rotatable friction surfaces.

2. The invention described in claim 1 wherein said braking device includes a casing and a pair of opposed jaws each provided with alternate projections and recesses, the projections comprising said friction surfaces.

3. The invention as described in claim 1 wherein said braking device comprises a tubing of zig-zag shape.

4. In combination, a towing vehicle and a towable vehicle, a cable braking device connected to one of said vehicles and a mechanical connection provided on the other of said vehicles, a cable secured to said mechanical connection at one end and adapted to be slidingly engaged within said braking device at a distance from said end, storage means including a reel associated with said braking device for storing a portion of said cable in a coiled condition to be payed out through said cable braking device, a portion of the cable on said storage means being wound in the shape of a cone, said braking device having a channel provided with a plurality of non-rotatable friction surfaces adapted to be progressively engaged by said cable, whereby the increased force required to unwind said cable in the shape of a cone causes increased frictional force between said cable and said friction surfaces to thereby control the rate at which the stored portion of said cable is payed out, said braking device also including a casing and a pair of opposed jaws each provided with projections comprising said friction surfaces and recesses between adjacent projections, and stopping means on said cable for cooperating with said friction surfaces to thereby arrest the passage of said cable through said braking device, said stopping means comprising an enlarged diameter section of said cone wound portion for cooperating with said projections, whereby said cable is arrested by said enlarged diameter section becoming wedged between the projections on said opposed jaws.

5. In combination, a towing vehicle and a towable vehicle, a cable braking device connected to one of said vehicles and a mechanical connection provided on the other of said vehicles, a wire cable secured to said mechanical connection at one end and adapted to be slidingly engaged within said braking device at a distance from said end, storage means including a reel associated with said braking device for storing a portion of said cable in a coiled condition to be payed out through said cable braking device, a portion of the cable on said storage means being wound in the shape of a cone having a backwardly decreasing diameter, a portion of the cable of said cone being provided with a progressively enlarged diameter along its length, said device having a channel provided with a plurality of non-rotatable friction surfaces adapted to be progressively engaged by said cable, whereby the increased force required to unwind said cable in the shape of a cone causes increased frictional force between said cable and said friction surfaces to thereby control the rate at which the stored portion of said cable is payed out, and the travel of said cable through said braking device being arrested when said enlarged diameter portion of said cable engages said non-rotatable friction surfaces.

References Cited in the file of this patent

UNITED STATES PATENTS

| | | |
|---|---|---|
| 2,183,540 | Campbell et al. | Dec. 19, 1939 |
| 2,615,656 | Strake | Oct. 28, 1952 |
| 2,823,035 | Crandall | Feb. 11, 1958 |
| 2,923,549 | Hopper et al. | Feb. 2, 1960 |